Jan. 26, 1965 R. A. DISCHERT 3,167,681

ELECTROSTATIC DEFLECTION CIRCUIT

Filed March 27, 1962 4 Sheets-Sheet 1

INVENTOR.
ROBERT A. DISCHERT
BY
Floyd M. Harris
Attorney

INVENTOR.
ROBERT A. DISCHERT
BY
Floyd M. Harris
Attorney

INVENTOR.
ROBERT A. DISCHERT
BY
Floyd M. Harris
Attorney

INVENTOR.
ROBERT A. DISCHERT
BY
Floyd M. Harris
Attorney

United States Patent Office 3,167,681

Patented Jan. 26, 1965

3,167,681
ELECTROSTATIC DEFLECTION CIRCUIT

Robert A. Dischert, Burlington Township, Burlington County, N.J., assignor to Radio Corporation of America, a corporation of Delaware Filed Mar. 27, 1962, Ser. No. 182,781
6 Claims. (Cl. 315—25)

This invention relates to improved electrostatic deflection circuits and particularly to improved deflection circuits for use in television cameras that include at least two picture pickup tubes, one of which employs electromagnetic deflection and at least one of which employs electrostatic deflection, wherein the electrostatic deflection deflects the beam of the pickup tube across an optical black strip for black level setting as described in patent application Ser. No. 182,810, filed on the same day as the present application, in the name of Sidney L. Bendell, and entitled Television Black Level Setting, now Patent No. 3,126,447, issued March 24, 1964.

The invention will be described as used in a four pickup tube camera provided with a high resolution pickup tube such as an image orthiocon employing electromagnetic deflection and further provided with three vidicons employing electrostatic deflection.

An object of the present invention is to provide an improved electrostatic deflection circuit.

A further object of the invention is to provide an improved circuit for producing an electrostatic deflection that tracks with an electromagnetic deflection and which also has a forward sweep deflection, part of which occurs during the return time portion of the electromagnetic deflection.

In practicing one embodiment of the invention, the forward sweep portion of the electrostatic deflection wave that is to sweep the pickup tube beam across the picture image is derived from a sampling resistor connected in series with the horizontal deflection coil of the pickup tube employing electromagnetic deflection. The voltage wave from the sampling resistor is applied to a direct-current setter followed by a clamping circuit. The resulting voltage wave is supplied to an adding circuit. There is also generated and supplied to the adding circuit a voltage of a wave form that when added to said resulting voltage wave produces a combined wave that is a sawtooth wave having a forward sweep portion part of which occurs during the return time portion of the electromagnetic deflection.

The sawtooth wave resulting from the addition of the two waves is a comparatively low amplitude wave. It is amplified to a comparatively high amplitude voltage wave suitable for the desired horizontal deflection. This high amplitude voltage wave is then applied to one plate of a pair of horizontal deflecting plates with one polarity and to the other plate of the pair with the opposite polarity.

The invention will be described in detail with reference to the accompanying drawing, in which, FIGURE 1 is a block diagram of a television transmitting system which employs a four pickup tube color camera in which the present invention is employed.

Figure 1:
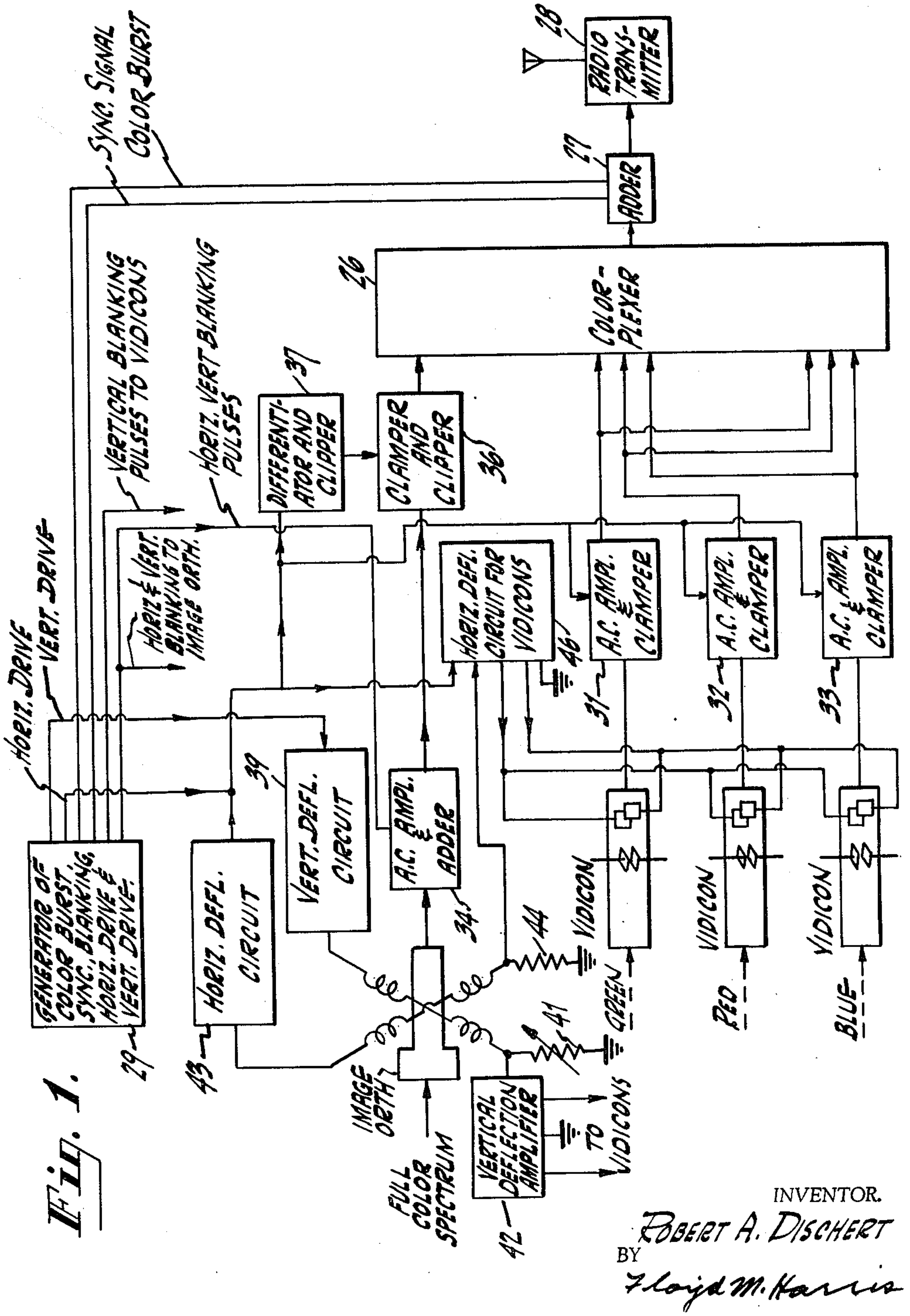
Figure 3:
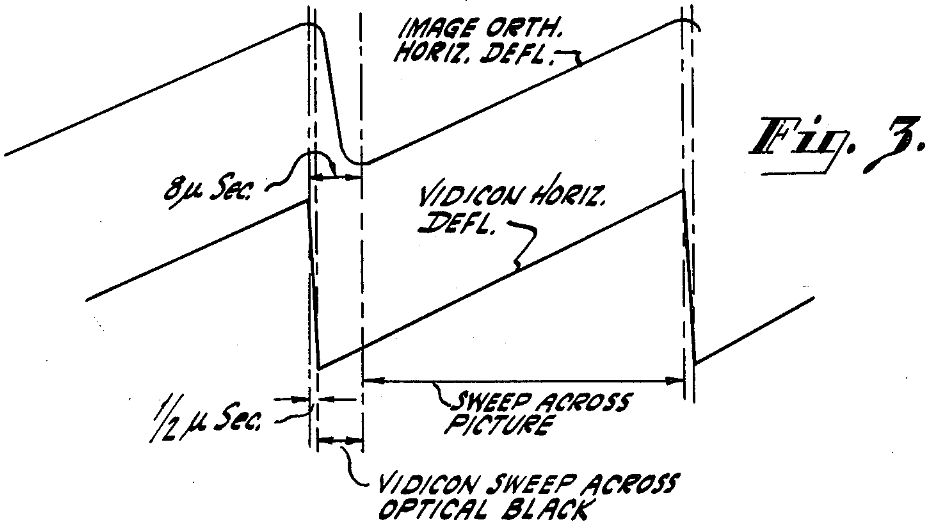
Figure 4:
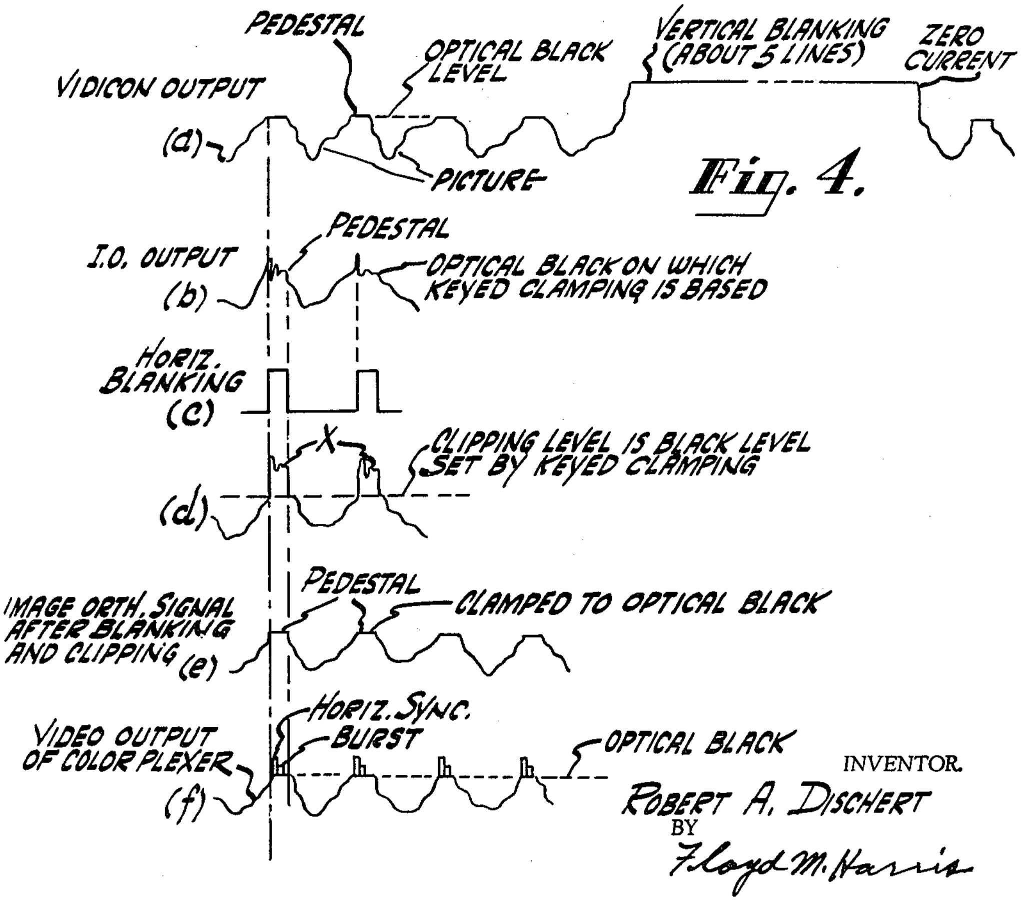
Figure 6:
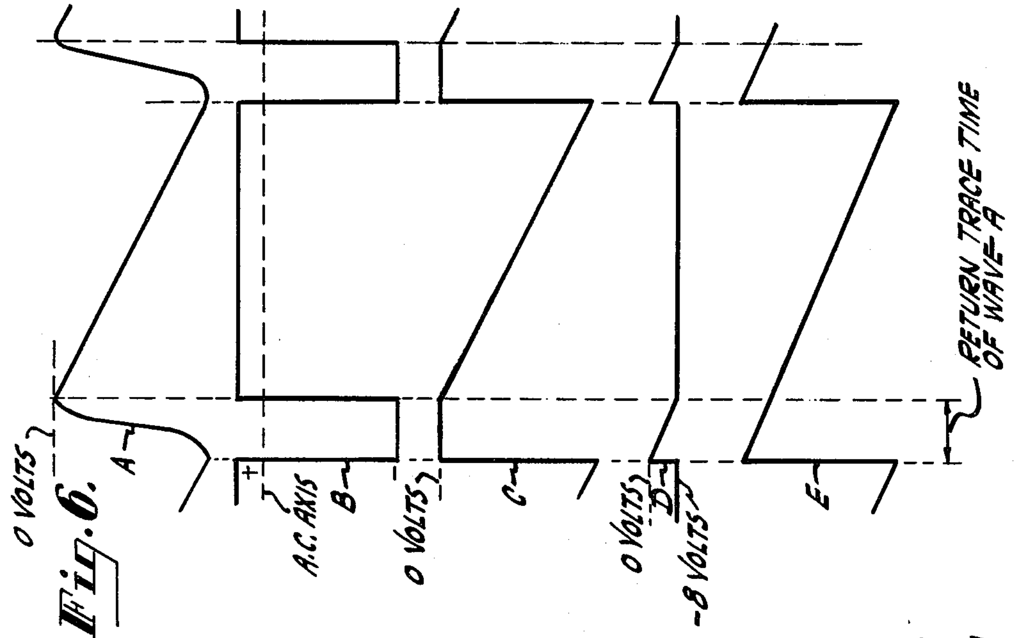
Figure 7:
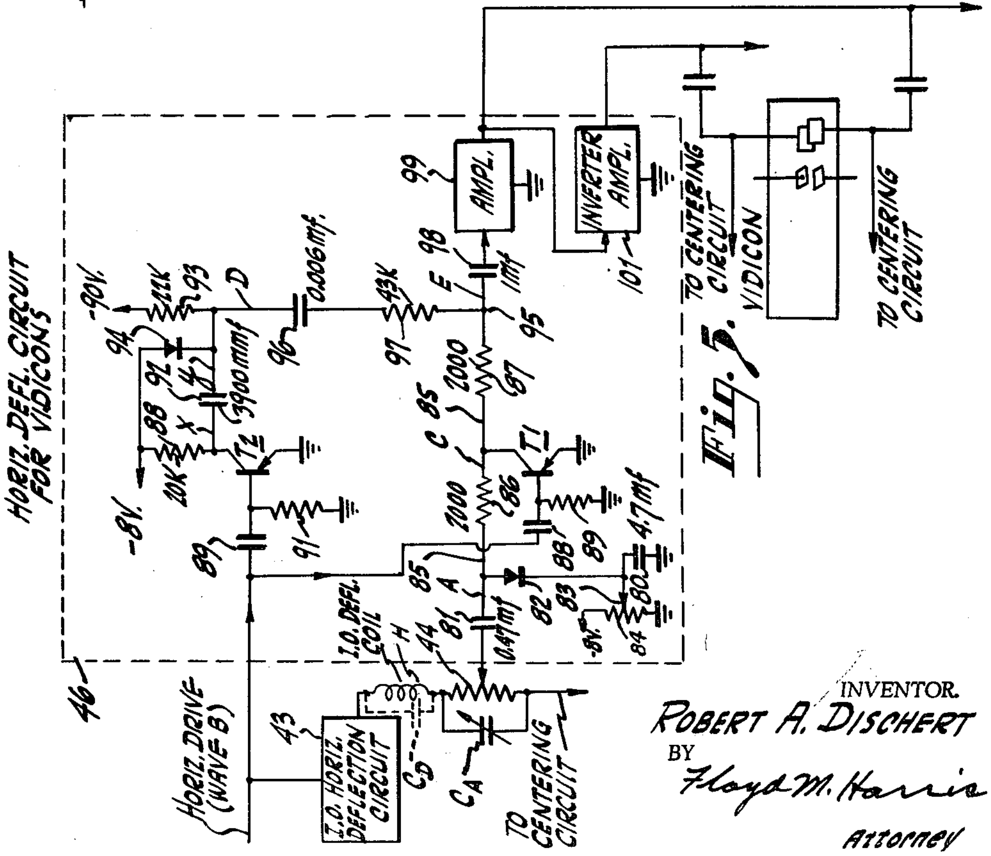

FIGURE 3 is a pair of graphs illustrating the horizontal deflection for the image orthicon and for the vidicons, FIGURE 4 is a group of graphs representing picture signals and blanking and synchronizing pulses that appear at different points in the camera shown in FIGURE 1, FIGURE 5 is a circuit and block diagram of an electrostatic deflection circuit embodying the present invention, and FIGURE 6 is a group of graphs that are referred to in explaining the operation of the circuit of FIGURE 5.

In the several figures, like parts are indicated by similar reference characters.

FIGURE 1 is a block diagram of a four pickup tube color camera in which the present invention is employed. The camera is of the type described in patent application Ser. No. 119,871, filed June 27, 1961, in the name of Aldo V. Bedford, and entitled Color Television Camera System. The camera comprises three vidicons which pick up, respectively, three primary colors such as the red, green, and blue of the scene and a high resolution tube such as an image orthicon which picks up the complete color spectrum of the scene. As explained in the Bedford application the low resolution vidicons function as the color pickup tubes to provide the three different color signals from which the color-difference signals are derived. The high resolution image orthicon functions as a luminance pickup tube to provide the luminance signal which is transmitted with the color-difference signals. The color signals and the luminance signals are applied to a conventional colorplexer 26 where they are processed to obtain the video signal for transmission. The colorplexer output is supplied to a circuit represented by adder 27 where the synchronizing signal and the color burst are added to the color plexer output. The combined signals are supplied to the radio transmitter 28.

The synchronizing signal and the color burst are supplied from a generator 29. This generator also supplied vertical and horizontal blanking pulses, and horizontal and vertical drive pulses for the deflection circuits.

The three vidicon outputs are fed to the colorplexer 26 through A.-C. amplifiers including D.-C. setters or clampers as represented at 31, 32 and 33, respectively. The image orthicon output is fed through an alternating-current amplifier and adder 34 where blanking pulses are added, and then to a keyed clamper and clipper 36 for setting the black level of the output. The clamper may be keyed by differentiated and clipped horizontal drive pulses as indicated by the block 37 to obtain the black level setting as explained later, or they may be keyed by narrow pulses suitably delayed by a delay circuit.

Each of the three vidicons is operated with a picture black strip along one side of its screen or target so that the horizontal sweeps of the vidicon beam sweep over the black strip. An opaque strip of material may be cemeted on the vidicon face plate to obtain the black strip on the target. In the specific example being described, however, the black strip on the target is formed by an opaque strip on the field lens of the optical system used to image the scene on the vidicons as will be described later with reference to FIGURE 2.

In the embodiment of the invention illustrated in FIGURE 1, the image orthicon is provided with electromagnetic deflection and the vidicons are provided with electrostatic deflection, the return time of the horizontal electrostatic deflection being so short that there may be provided a substantial forward sweep portion of this deflection that occurs during the return time of the electromagnetic deflection. This is illustrated in FIGURE 3.

The first graph of FIGURE 3 shows the current flowing through the horizontal deflection coil of the image orthicon. The return time is about eight or ten microseconds. This may be a conventional deflection circuit provided with the usual centering control (not shown). The second graph shows the horizontal deflection voltage which is applied to the horizontal deflection plates of the vidicons. The return time is made very short, preferably less than one microsecond. In the example illustrated the return time is one-half microsecond. It will be noted that with this short return time part of the horizontal forward sweep for the vidicons is occurring during the return time of the image orthicon horizontal deflection and, as indicated by the legend, this part of the horizontal forward sweep is sweeping the vidicon beam across the strip of picture or optical black. This part of the forward sweep is provided by adding a sweep voltage to a sweep voltage that is derived from the electromagnetic deflection as described hereinafter. Thus, black level is set for the vidicon output, and there is no reduction in the forward sweep time available for the picture or scene.

Before considering the horizontal deflection in more detail, the vertical deflection means shown in FIGURE 1 will be described. The electromagnetic vertical deflection for the image orthicon is provided by a deflection circuit 39 driven by the vertical drive pulses and is conventional except that a low impedance sampling resistor 41, preferably adjustable, is connected in series with the vertical deflection coil. The voltage appearing across resistor 41 has the same waveform as that of the current flowing through the deflection coil. This voltage is applied to a vertical deflection amplifier 42 which supplies to the vertical deflection plates of the three vidicons a deflection voltage of the same wave shape as that appearing across sampling resistor 41. The deflection circuit includes suitable size control means (not shown) for adjusting the deflection size at each vidicon. Also, suitable centering means (not shown) are provided. It will be evident that the use of this deflection circuit for the vidicons makes it easy to insure that the vidicon vertical deflection tracks with the image orthicon vertical deflection.

Referring again to the horizontal deflection, and particularly to the block diagram of the present invention as illustrated in FIGURE 1, the electromagnetic horizontal deflection circuit 43 driven by the horizontal drive pulses and is conventional except that a low impedance sampling resistor 44 is connected in series with the horizontal deflection coil. The voltage appearing across sampling resistor 44 has the same wave form as that of the current flowing through the horizontal deflection coil. It is supplied to a horizontal deflection circuit 46 where it is direct-current set and clamped as described later. In order to obtain a horizontal deflection voltage that has a forward sweep occurring during the horizontal retrace time of the image orthicon deflection as shown in FIGURE 3, the horizontal drive pulses are also supplied to the deflection circuit 46 for generation of a forward sweep wave occurring during image orthicon deflection retrace. In the deflection circuit 46 this forward sweep wave is added to the main forward sweep wave derived from the resistor 44 to obtain the vidicon horizontal deflection wave shown in FIGURE 3. The details of the deflection circuit 46 are shown in FIGURE 5 and described hereinafter.

Refer now to the graphs of FIGURE 4 which show signals as they appear at various points in the system of FIGURE 1. Graph (*a*) represents the signal that appears at the output of each of the three vidicons. At the end (or beginning) of each horizontal scan producing picture signal there is the scan across optical black to produce a pedestal having a height that is at picture black level. Because of the speed of the return trace, no horizontal blanking at the vidicons is provided.

Vertical blanking is applied to the vidicons in the example of FIGURE 1, however, since the vertical deflection wave for the vidicons is taken off resistor 41 so that the vertical return time is the same as that for the image orthicon and, therefore, is of substantial duration. Since the vertical blanking pulse cuts off the beam of the vidicon, the vidicon output is zero during the vertical blanking period, as shown in graph (*a*), and does not represent optical black. It is evident that the vidicon output should be clamped to the tops of the pedestals which are at black level, and not to the zero current level. In the example of FIGURE 1, the horizontal drive pulses are supplied to the units 31, 32 and 33 in the vidicon channels as keying pulses for operating keyed clampers in these units. In the example illustrated, there is no provision for switching off the keying pulses during vertical blanking because this blanking lasts for only a few scanning lines (about five). This is such a small percentage of the total number of lines that the resulting error in black level setting is insignificant providing the clamping circuit time constants. During the period the clamping circuit is keyed on for introducing a correction, the time constant for the correction should be short. During the period that the clamping circuit is inactive, i.e., between keyed-on periods, the time constant of the store or holding portion of the clamping circuit should be comparatively long.

Graph (*b*) of FIGURE 4 represents the image orthicon output. During the horizontal return trace, during which the image orthicon is blanked by applying blanking pulses to the target, the pedestal is formed with a height equivalent to optical black, but usually some unwanted signal appears on part of the pedestal. To remove this unwanted signal the image orthicon output is supplied to the amplifier and adder circuit 34 where horizontal blanking pulses shown in graph (*c*) are added to obtain a signal of the form shown in graph (*d*).

The output of amplifier and adder 34, graph (*d*), is supplied to the clamper and clipper 36 where it is clipped at black picture level to obtain the signal of graph (*e*). This signal now has clean pedestals with their tops at the optical black level. In order to clip the signal (*d*) at the picture black level, it is clamped on the later occurring portion $x$ of the pedestal that is free from signal corruption. A fixed bias is set with reference to this clamping level to clip the signal at black level. The keying pulses for clamping on the portions $x$ may be obtained from the circuit 37 which differentiates the horizontal drive pulses, and inverts and clips the differentiated wave to obtain a keying pulse occurring during the "clean" portion of the blanking pulse.

The graph (*f*) of FIGURE 4 represents the signal during horizontal scanning as it appears at the output of the adder 27 after the synchronizing signal and the color burst have been added to the signal output of the colorplexer.

Figures 2, 2A:
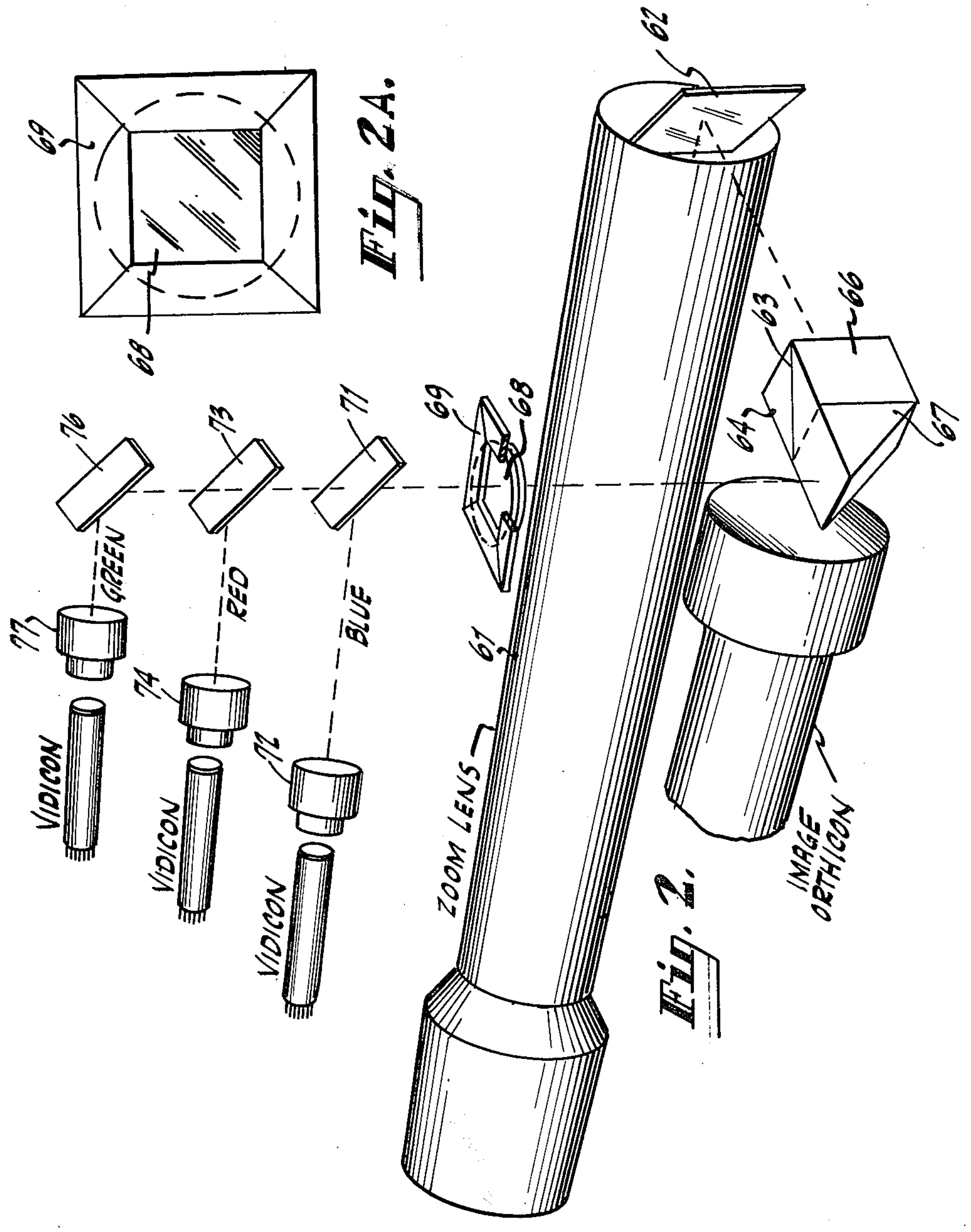
FIGURE 2 is a perspective view of an optical system that may be employed for imaging the scene on the pickup tubes.
FIGURE 2A is a plan view of the field lens and its supporting frame embodied in the optical system of FIGURE 2.

Brief mention has been made of the optical system, shown in FIGURE 2, for imaging a scene on the pick-up tubes. This system, which is only one specific example of what may be used, will now be described in more detail.

The optical system shown in FIGURE 2 is of the general type indicated schematically in the above-identified Bedford application. In the specific embodiment of FIGURE 2 a zoom lens 61 is used to pick up the scene to be televised. The light rays from the lens 61 are directed by a mirror 62 to a partially reflecting surface 63 which directs 20 percent of the light to the image orthicon screen or target on which the scene is imaged. The surface 63 may be a partially silvered surface and is on the 45 degree surface of a right angle prism 64. A second right angle prism 66 has its 45 degree surface cemented to the surface 63. A right angle prism 67 is cemented to the prism 66 to reflect the remaining 80 percent of the light upward to a field lens 68 located where the image of the scene is formed in space.

The field lens 68 is supported by a metal frame 69 which, since it extends slightly over the lens as shown more clearly in FIGURE 2A, causes the scene image to be projected on the vidicon targets with a dark strip along the edge of the scene image.

Light collected by the lens 68 passes to a dechroic mirror 71 which reflects the blue light of the scene to a camera lens 72. The lens 72 images the blue portion of the scene on the target of one of the three vidicons. The red portion of the light passing through the dichroic mirror 71 is reflected from a dichroic mirror 73 to a camera lens 74 which images the red portion of the scene on the target of another one of the vidicons. The light passing through the dichroic mirror 73 is the green portion of the scene which is reflected by a mirror 76 to a camera lens 77 which images the green portion of the scene on the target of the third vidicon.

The details of the horizontal electrostatic deflection circuit 46 of FIGURE 1 will now be described with reference to FIGURE 5. It will be recalled that with the circuit 46 the portion of the deflecting wave that sweeps the vidicon beam across the picture image is derived from the electromagnetic deflection circuit so that the horizontal scan for the vidicons is easily made to track with the horizontal scan for the image orthicon. Also, to obtain a deflection wave that has a forward sweep portion occurring during the image orthicon retrace, an additional forward sweep wave portion is combined with the picture image sweep portion. This general type of circuit is described in application Ser. No. 182,855, filed on the same day as the present application in the names of Sidney L. Bendell and William J. Cosgrove, and entitled Deflection Circuit, now Patent Number 3,089,978, issued May 14, 1963. The present invention is an improvement on the Bendell and Cosgrove deflection circuit.

Referring to FIGURE 5, the forward sweep portion of the deflection wave is taken off the sampling resistor 44 through which the image orthicon deflection current flows. The lower end of this resistor is indicated as going to a conventional centering circuit. The voltage wave from sampling resistor 44 is applied through a coupling capacitor 81 to a conductor line 85. A diode 82 for D.-C. setting has its anode connected to the conductor line 85. The cathode of diode 82 is connected to an adjustable tap 83 on a potentiometer 84 so that the cathode may be set either at ground or at a slightly negative potential. A by-pass capacitor 80 may be provided. The capacitor 81 and diode 82 act as a D.-C. setter so that the wave from sampling resistor 44 is as shown at A in FIGURE 6 with the positive peak of the wave set at approximately zero volts. This setting is obtained because the positive peak of wave A makes the diode 82 conduct so that the anode side of the diode goes nearly to the potential of the tap 83 which, in this example, is assumed to be set at ground potential. The anode side of diode 82 may be set exactly to zero volts if desired by setting the tap 83 at a slightly negative potential to compensate for the small voltage drop through the diode.

It may be noted that because of stray capacity $C_D$ across the horizontal deflection coil H the current flow through the sampling resistor 44 will be the current flowing through the coil H plus an error current unless a correction means is provided. In the absence of such correction some bars at one side of the picture display may be apparent. A suitable correction means may consist of a capacitor $C_A$ connected across the sampling resistor 44. The ratio of the impedance of sampling resistor 44 to the impedance of $C_A$ should be approximately equal to the ratio of the impedance of coil H to the impedance of $C_D$, these impedance values being those at the frequency of oscillation of the coil H with its distributed capacity $C_D$, which oscillation is initiated by the deflection return. This frequency usually is about 60 kilocycles per second. The capacitor $C_A$ preferably is adjustable so that, after a selection of the approximately correct value, its value may be adjusted to more completely eliminate the effect of the error current. It may be noted, merely by way of example, that in one particular deflection circuit a suitable value for $C_A$ was 0.033 microfarad where the value of the sampling resistor 44 was 8 ohms.

The wave C shown in FIGURE 6 is obtained by use of a clamping circuit comprising a transistor T1 that is driven to saturation by the horizontal drive wave B shown in FIGURE 6. The emitter of T1 is connected to ground. The collector of T1 is connected to the conductor line 85 at a point between a resistor 86 and a resistor 87 that are connected in series relation in the conductor line 85. Reference to wave A of FIGURE 6 will show that as soon as the D.-C. setter 81, 82 has established the peak of wave A at zero volts, the rising portion of the wave occurring during the return time is always negative, that is, below ground potential. This negative voltage feeds through the resistor 86 to the collector of T1, thus applying an operating voltage to the collector so that T1 can be driven to saturation. The resistor 86 is provided to limit the current drawn from capacitor 81, and also to minimize the requirements for saturation current needed in transistor T1. The resistor 87 is an adding resistor, as will be understood later, which terminates at a junction point 95.

The horizontal drive pulses (wave B of FIGURE 6) are applied with negative polarity through a coupling capacitor 88 to the base of transistor T1. An input circuit resistor 89 is connected between the base and ground. The horizontal drive pulses drive the transistor T1 to saturation to thereby hold the wave C at zero volts during the return trace time of the wave A. Immediately following the negative pulse portion of wave B, the wave B applies a slightly positive voltage to the base of T1 which holds it cut off until the next pulse portion occurs. Thus the voltage wave C is generated and applied to the adding resistor 87.

In order to obtain the desired sawtooth voltage wave E of FIGURE 6, the wave D of FIGURE 6 is generated and added to the wave C. The wave D is generated by a circuit that includes a transistor T2. The emitter of transistor T2 is grounded; its collector is connected through a resistor 88 to a negative voltage, minus 8 volts in this example. The negative horizontal drive pulses (wave B) are applied through a coupling capacitor 89 to the base of transistor T2. An input resistor 91 is connected from the base of T2 to ground.

A capacitor 92 has one side connected to the collector of T2, and has the other side connected through a resistor 93 to a comparatively high negative voltage, minus 90 volts in this example. A diode 94 is connected between the minus 8 volt source and the minus 90 volt side of the capacitor 92, the anode being connected to the minus 8 volt source. The minus 90 volt side of capacitor 92 is connected through a coupling capacitor 96 to an adding resistor 97 which terminates at the junction point 95.

The generation of the wave D will now be described. Between the negative pulses of the wave B the transistor T2 is an open circuit so that the voltage at both points $x$ and $y$ on opposite sides of the capacitor 92 must be equal to minus 8 volts. This is apparent since with T2 open (cut-off) there is no current flow through resistor 88 and point $x$ must be at minus 8 volts. The point $y$ is at minus 8 volts since point $y$ can settle toward minus 90 volts only until it reaches minus 8 volts; beyond minus 8 volts the diode 94 conducts and shorts the point $y$ to minus 8 volts.

When the negative pulse of wave B occurs it drives transistor T2 to saturation and forces its collector to go to approximately zero volts. Since there is no charge on capacitor 92, the point $y$ also momentarily goes to zero volts, and the diode 94 is opened up (becomes non-conducting).

Capacitor 92 now begins to charge toward minus 90 volts. When the point $y$ reaches minus 8 volts, diode 94 conducts and holds the point $y$ at minus 8 volts. The value of resistor 93 is selected so that point $y$ reaches minus 8 volts at the termination of the negaitve horizontal drive pulse (wave B). When the negative pulse terminates, the transistor T2 again opens up and the capacitor 92 discharges to its initial condition of zero charge. The discharge path of capacitor 92 is through resistor 88 and diode 94.

Thus the voltage wave D is generated and applied through the coupling capacitor 96 to the adding resistor 97. The waves C and D appear added at junction point 95, the added waves being the wave E, and they are are applied through a coupling capacitor 98 to a transistorized amplifier 99 which has substantially zero input impedance. The output of this amplifier is, for example, of positive polarity and is applied to one plate of the horizontal deflection plates of the vidicons. The output of amplifier 99 is also applied to a polarity inverting amplifier 101 of one-to-one gain which supplies an opposite polarity deflecting wave to the other plate of each pair of horizontal deflecting plates. The deflecting voltages from amplifiers 99 and 101 preferably are supplied to the deflecting plates through coupling capacitors. Centering voltages may then be applied to the deflecting plates from a conventional centering circuit.

Referring more specifically to the addition of the waves C and D, it is a current addition. Since the amplifier 99 has substantially zero input impedance, the voltage wave C produces a current at junction point 95 that is a function of the wave form of wave C only. Similarly, the voltage wave D produces a current at junction point 95 that is a function of the wave form of wave D only. The two currents add to form the current wave E which is amplified by amplifiers 99 and 101 to produce the desired large amplitude deflection voltages of corresponding wave form.

In FIGURE 5 certain capacitor and resistor values are given merely by way of example. These values are given in microfarads, micro-microfarads, ohms and thousands of ohms.

What is claimed is:

1. In combination, an electromagnetic deflection system and an electrostatic deflection system, said electromagnetic deflection system comprising a deflection coil through which deflection current flows, said current having a waveform that has a forward trace time portion and a return time portion, means for obtaining from said electromagnetic deflection system a voltage having a forward trace time portion and a return time portion with the forward trace time portion being the same as the forward trace time portion of said current, said electrostatic deflection system comprising an adding circuit, circuit means to which the voltage obtained from said electromagnetic deflection system is applied and through which there is supplied to said adding circuit a second voltage having a waveform in which a forward trace time portion corresponds to the forward trace time portion of said first-mentioned voltage, means for generating and supplying to said adding circuit a voltage wave that occurs during the return time portion of said current waveform and which has a waveshape such that when it is added to said second voltage there is obtained a combined wave having a forward trace time portion all of which has the same degree of slope and part of which occurs during the return time portion of said deflection current, means for amplifying said combined wave and for supplying said amplified wave with one polarity for application to one plate of a pair of electrostatic deflection plates and for supplying said amplified wave with the opposite polarity for application to the other plate of said pair of electrostatic deflection plates.

2. In combination, an electromagnetic deflection system and an electrostatic deflection system, said electromagnetic deflection system comprising a deflection coil through which deflection current flows, a sampling resistor connected in series with said coil whereby there appears across said sampling resistor a voltage of the same waveform as that of said deflection current, said waveform having a forward trace time portion and a return time portion, said electrostatic deflection system comprising an adding circuit, circuit means to which the voltage from said sampling resistor is applied and through which there is supplied to said adding circuit a voltage having a waveform in which a forward trace time portion corresponds to the forward trace time portion of the voltage from the sampling resistor, means for generating and supplying to said adding circuit a voltage wave that occurs during said return time portion and which has a waveshape such that when it is added to the voltage supplied from said circuit means there is obtained a combined wave having a forward trace time portion all of which has the same degree of slope and part of which occurs during the return time portion of said deflection current, means for amplifying said combined wave and for supplying said amplified wave with one polarity for application to one plate of a pair of electrostatic deflection plates and for supplying said amplified wave with the opposite polarity for application to the other plate of said pair of electrostatic deflection plates.

3. In combination, an electromagnetic deflection system and an electrostatic deflection system, said electromagnetic deflection system comprising a deflection coil through which deflection current flows, said current having a waveform that has a forward trace time portion and a return time portion, means for obtaining from said electromagnetic deflection system a voltage having a forward trace time portion and a return time portion with the forward trace time portion being the same as the forward trace time portion of said current, said electrostatic deflection system comprising an adding circuit, circuit means to which the voltage obtained from said electromagnetic deflection system is applied and through which there is supplied to said adding circuit a second voltage having a waveform in which a forward trace time portion corresponds to the forward trace time portion of said first-mentioned voltage, said circuit means including a direct-current setter for setting the most positive excursions of said first-mentioned voltage to a predetermined level, a clamping circuit following said direct-current setter, and means for activating said clamping circuit during and only during the occurrence of said return time portion to clamp said first mentioned voltage to said predetermined level during said return time portion whereby said second voltage is obtained, means for generating and supplying to said adding circuit a valtage wave that occurs during the return time portion of said current waveform and which has a waveshape such that when it it added to said second voltage supplied from said circuit means there is obtained a combined wave having a forward trace time portion part of which occurs during the return time portion of said deflection current, means for amplifying said combined wave and for supplying said amplified wave with one polarity for application to one plate of a pair of electrostatic deflection plates and for supplying said amplified wave with the opposite polarity for application to the other plate of said pair of electrostatic deflection plates.

4. In combination, an electromagnetic deflection system and an electrostatic deflection system, said electromagnetic deflection system comprising a deflection coil through which deflection current flows, a sampling resistor connected in series with said coil whereby there appears across said resistor a voltage of the same waveform as that of said deflection current, said waveform having a forward trace portion and a return time portion, said electrostatic deflection system comprising a direct-current setter circuit to which the voltage from said resistor is applied, an adding circuit, a conductor through which the voltage from said direct-current setter is supplied to said adding circuit, clamping means connected to said conductor, means for activating said clamping means during said return time portion to clamp said voltage during said return time portion to the voltage level to which it is set by said direct-current setter, whereby the resulting voltage wave applied to said adding circuit has a level portion followed by a sloping portion, means for generating an additional voltage wave that has a sloping portion during said return time portion with the slope going in the same direction as the slope of said resulting wave, and means for adding said resulting voltage wave and said additional voltage wave to obtain a combined voltage wave having a forward trace portion part of which occurs during the return time portion of said deflection current.

5. In combination, an electromagnetic deflection system and an electrostatic deflection system, said electromagnetic deflection system comprising a deflection coil through which deflection current flows, a sampling resistor connected in series with said coil whereby there appears across said resistor a voltage of the same waveform as that of said deflection current, said waveform having a forward trace portion and a return time portion, said electrostatic deflection system comprising a direct-current setter circuit to which the voltage from said resistor is applied, an adding circuit, a conductor through which the voltage from said direct-current setter is supplied to said adding circuit, clamping means connected to said conductor, means for activating said clamping means during said return time portion to clamp said voltage during said return time portion to the voltage level to which it is set by said direct-current setter, whereby the resulting voltage wave applied to said adding circuit has a level portion followed by a sloping portion, means for generating an additional voltage wave that has a sloping portion during said return time portion with the slope going in the same direction as and of the same degree of slope as the slope of said resulting wave, and means for adding said resulting voltage wave and said additional voltage wave to obtain a combined voltage wave having a forward trace portion all of which is of substantially the same degree of slope and part of which occurs during the return time portion of said deflection current.

6. In combination, an electromagnetic deflection system and an electrostatic deflection system said electromagnetic deflection system comprising a deflection coil through which deflection current flows, a sampling resistor connected in series with said coil whereby there appears across said resistor a voltage of the same waveform as that of said deflection current, said waveform having a forward trace portion and a return time portion, said electrostatic deflection system comprising a direct-current setter circuit to which the voltage from said resistor is applied, an adding circuit, a conductor through which the voltage from said direct-current setter is supplied to said adding circuit, clamping means connected to said conductor, means for activating said clamping means during said return time portion to clamp said voltage during said return time portion to the voltage level to which it is set by said direct-current setter, whereby the resulting voltage wave applied to said adding circuit has a level portion followed by a sloping portion, means for generating an additional voltage wave that has a sloping portion during said return time portion with the slope going in the same direction as and of the same degree of slope as the slope of said resulting wave, means for adding said resulting voltage wave and said additional voltage wave to obtain a combined voltage wave having a forward trace portion all of which is of substantially the same degree of slope and part of which occurs during the return time portion of said deflection current, and means for amplifying said combined wave and for supplying said amplified wave with one polarity for application to one plate of a pair of electrostatic deflection plates and for supplying said amplified wave with the opposite polarity for application to the other plate of said pair of electrostatic deflection plates.

References Cited in the file of this patent

UNITED STATES PATENTS 2,248,556 Schlesinger ---------------- July 8, 1941

OTHER REFERENCES

IRE Dictionary of Electronics Terms and Symbols, Institute of Radio Engineers, New York, 1961, p. 130.